No. 828,521. PATENTED AUG. 14, 1906.
A. N. SINCLAIR.
CAMERA LEVELING AND PLUMBING DEVICE.
APPLICATION FILED NOV. 9, 1905.
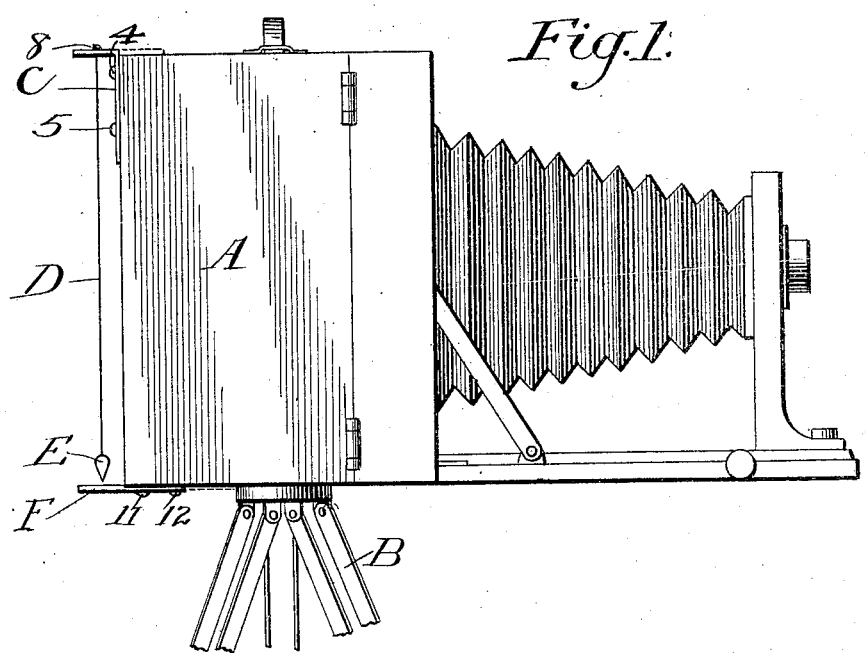
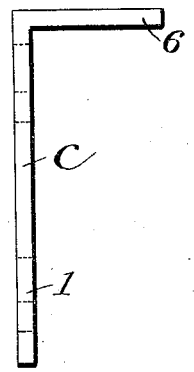
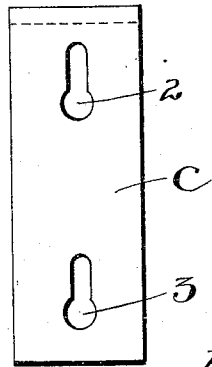
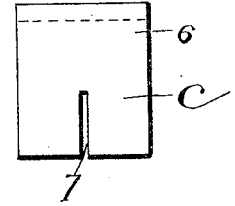
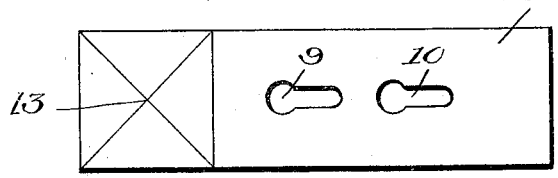
Witnesses:
D. W. Edelin.
J. E. Hutchinson Jr.
Inventor:
A. N. Sinclair,
by Pennie & Goldsborough,
Attys.
THE NORRIS PETERS CO., WASHINGTON, D. C.

UNITED STATES PATENT OFFICE.

ARCHIBALD NEIL SINCLAIR, OF HONOLULU, TERRITORY OF HAWAII.

CAMERA LEVELING AND PLUMBING DEVICE.

No. 828,521.  Specification of Letters Patent.  Patented Aug. 14, 1906.

Application filed November 9, 1905. Serial No. 286,631.

*To all whom it may concern:*

Be it known that I, ARCHIBALD NEIL SINCLAIR, of Honolulu, in the Island of Oahu, Territory of Hawaii, have discovered and invented a new and useful Camera Leveling and Plumbing Device, which device is fully set forth and described in the following specification and in the accompanying drawings, which are hereby referred to and made a part hereof.

This invention relates to means for leveling and plumbing cameras. To this end a plumb-line, a support therefor adapted to be attached to a suitable portion of the camera, and an indicator are provided.

The invention can be best described in connection with its illustration in the accompanying drawings, in which—

Figure 1 is a side elevation of a camera to which the invention is applied. Fig. 2 is an end view of a support for the plumb-line. Fig. 3 is a side elevation of the same. Fig. 4 is a plan view of the same. Fig. 5 is a plan view of the indicator. Fig. 6 is a side elevation of the same.

Referring to the drawings, the camera A may be of any usual or suitable construction and may be supported upon a tripod B or in any other suitable manner. To the rear of the camera or to any other suitable portion thereof is secured the angular support C for the plumb-line D, to the lower end of which is secured the weight E, while projecting from the camera beneath the weight E is an indicator F. The support C is shown as bent at an angle, the longer side 1 being provided with holes 2 and 3, which at their lower ends are of sufficient size to permit the passage of the heads of screws 4 and 5, fixed to the camera, but which at their upper ends are contracted to prevent the passage of the screw-heads. The shorter leg 6 of the support C has a slot 7, through which the plumb-line D may pass until its downward movement is limited by a knot 8 in the line or other suitable means. The indicator F has holes 9 and 10, similar to the holes 2 and 3, which, in conjunction with the screws 11 and 12, secured to the camera, furnish a means for securing the indicator to the camera in a manner similar to that employed in connection with securing the support C. Upon the indicator any suitable point, as 13, may be marked, and by suitable adjustment of the proportions of the plumb-line support and the indicator, including the locations of the holes, whereby the support and indicator are secured to the camera, and also by properly positioning the securing-screws, the lower pointed end of the plumb-weight E will be directly over the point 13 of the indicator when the camera is level.

During transportation of the camera or at other times when the leveling apparatus is not in use the plumb-line may be detached from the support by removing it from the slot 7, and both the support C and the indicator F may be removed by sliding them into such positions that the heads of their supporting-screws may pass through the holes in the support and indicator. The support might be reversed in position, so that its shorter side 6 would extend along the top of the camera, as shown in dotted lines in Fig. 1, instead of projecting from it, as it does when in use.

Considering the various parts of the leveling device as removed from the camera, if it be desired to level the instrument the support C is secured to the camera by passing the heads of the screws 4 and 5 through the larger ends of the holes 2 and 3, and the support is then moved downwardly until the upper ends of the holes come in contact with the screw-shanks, when the support will be held firmly in a predetermined position. The short side 6 of the support will then extend outwardly from the camera, and the plumb-line D having been placed within the slot 7 the weight E will move downwardly until arrested by the knot 8 coming in contact with the upper face of the side 6. The line and weight will then hang downwardly, as shown in Fig. 1. The indicator F is secured to the camera by means of the screws 11 and 12 in a similar manner to that observed in connection with the support C, when that end of the indicator which carries the marked point 13 will extend outwardly from the camera. The camera may then be adjusted until the point of the weight E is directly over the point 13, when the camera will be level.

What I claim is—

1. The combination with a camera, of a plumb-line support secured thereto, a plumb-line carried by said support, and an indicator secured to the camera for denoting the position thereof.

2. The combination with a camera, of a plumb-line support removably secured thereto, a plumb-line carried by said support, and an indicator removably secured to said camera for denoting the position thereof.

3. The combination with a camera, of an angular plumb-line support secured to the back thereof, a plumb-line carried by said support, and an indicator secured to the bottom of the camera and projecting from the rear thereof.

Dated at Honolulu, Oahu, Hawaii, February 10, 1905.

ARCHIBALD NEIL SINCLAIR.

Witnesses:
 ANTONIO PERRY,
 J. A. THOMPSON.